(12) United States Patent
Van Der Schrick (10) Patent No.: US 8,188,198 B2
(45) Date of Patent: May 29, 2012

(54) METHOD FOR OPTIMIZING ENERGY EFFICIENCY IN A POLYMERIZATION PROCESS

(75) Inventor: Bernard Van Der Schrick, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/669,385

(22) PCT Filed: Jul. 15, 2008

(86) PCT No.: PCT/EP2008/059248
§ 371 (c)(1),
(2), (4) Date: Jun. 14, 2010

(87) PCT Pub. No.: WO2009/010514
PCT Pub. Date: Jan. 22, 2009

(65) Prior Publication Data
US 2010/0280207 A1    Nov. 4, 2010

(30) Foreign Application Priority Data
Jul. 16, 2007 (EP) ..................... 07112523

(51) Int. Cl.
C08F 2/12 (2006.01)
C08F 2/00 (2006.01)
B01J 19/18 (2006.01)
F25B 27/02 (2006.01)

(52) U.S. Cl. ............. 526/88; 526/64; 526/920; 422/138

(58) Field of Classification Search .................... 526/88, 526/920, 64; 422/132, 138; 585/503, 910
See application file for complete search history.

(56) References Cited

U.S. PATENT DOCUMENTS
3,006,908 A * 10/1961 Dye ............................ 526/106
2006/0063896 A1    3/2006 McElvain et al.

FOREIGN PATENT DOCUMENTS
WO    WO 2006/026493    3/2006

OTHER PUBLICATIONS

Hung TC et al; "A Review of Organic Rankine Cycles (ORCs) for the recovery of low-grade waste heat" Energy, Pergamon Press, Oxford, GB, vol. 22, No. 7, 1997, pp. 661-667.

* cited by examiner

Primary Examiner — Fred M Teskin (57) ABSTRACT

The present invention relates to a process for cooling a polymerization reaction for producing polyolefin comprising the steps of:
(a) thermally contacting said polymerization reaction with a cooling fluid such that the cooling fluid removes thermal energy from said reaction,
(b) thermally contacting said cooling fluid with a working fluid thereby recovering said thermal energy from said cooling fluid in said working fluid, and
(c) thermally contacting the cooling fluid obtained in step (b) with the polymerization reaction thereby cooling said reaction, wherein the working fluid is phase converted thereby providing energy in the form of heat and/or electricity and/or mechanical power back to the polyolefin production process. Said invention also relates to a polymerization process for producing olefin polymers in a reactor, and also relates to a process for energy optimization of energy consumption in a polymerization process and to a polymerization unit.

15 Claims, 3 Drawing Sheets

METHOD FOR OPTIMIZING ENERGY EFFICIENCY IN A POLYMERIZATION PROCESS

CROSS-REFERENCE TO RELATED APPLICATIONS

This application claims the benefit of PCT/EP2008/059248, filed Jul. 15, 2008, which claims priority from EP 07112523.1, filed Jul. 16, 2007.

FIELD OF THE INVENTION

The present invention relates generally to olefin polymerization. The present also relates to a process for energy recovery in a polymerization process. More particularly, this invention relates to the efficient energy recovery of the heat produced by the cooling system of the reactor.

BACKGROUND OF THE INVENTION

Polyolefins such as polyethylene and polypropylene may be prepared by particle form polymerization, such as slurry polymerization or gas phase polymerization.

Olefin polymerizations are frequently carried out using monomer, diluent and catalyst and optionally co-monomers and hydrogen in a reactor. The polymerization is usually performed under slurry conditions, wherein the product consists usually of solid particles and is in suspension in a diluent. The slurry contents of the reactor are circulated continuously with a pump to maintain efficient suspension of the polymer solid particles in the liquid diluent. The product is discharged by means of settling legs, which operate on a batch principle to recover the product. Settling in the legs is used to increase the solids concentration of the slurry finally recovered as product slurry. The product is further discharged to a flash tank, through flash lines, where most of the diluent and unreacted monomers are flashed off and recycled. Alternatively, the product slurry may be fed to a second loop reactor serially connected to the first loop reactor where a second polymer fraction may be produced. Typically, when two reactors in series are employed in this manner, the resultant polymer product, which comprises a first polymer fraction produced in the first reactor and a second polymer fraction produced in the second reactor, has a bimodal molecular weight distribution.

Slurry polymerization in a loop reaction zone has proven commercially successful. The slurry polymerization technique has enjoyed international success with billions of pounds of polyolefins being so produced annually.

A variety of equipment and operations within a polyolefin manufacturing process may consume energy. Noteworthy consumers of electricity within a polyolefin plant, for example, may include the pumps that circulate the liquid reaction mixture in the polymerization reactors (e.g., loop slurry reactors), the pumps that circulate the cooling medium (e.g., treated water) through the polymerization reactor jackets, the compressors that pressurize and return recycled diluent (and/or monomer) to the polymerization reactor, the blowers used to convey fluff and pellets, and the extruders that convert the polyolefin fluff to polyolefin pellets. Significant users of steam in a typical polyolefin plant may include heaters that flash liquid in the effluent of the polymerization reactor, and fractionation columns that process recovered diluent and/or monomer. Relatively large consumers of fuel gas may include activation processes (which may utilize high heat) of the polymerization catalyst, and operations that maintain adequate combustible content in the plant flare header (in the feed to the flare). In general, extensive energy is required to polymerize the monomer and comonomer to polyolefin fluff, to process recycled effluent from the reactor, and to convert the polyolefin fluff to pellets.

Therefore, the production of polyolefin is an energy-intensive process, consuming electricity, steam, fuel gas, and so on. Such energy consumption generally contributes significant cost to the production of polyolefins, as well as to the downstream products constructed of polyolefins distributed to the customer.

WO 2006/026493 describes a manufacturing process for producing polyolefin configured to consume less than about 445 kilowatt-hours of electricity per metric ton of polyolefin produced.

However, there is still a need to improve the energy efficiency of polyolefin production processes.

SUMMARY OF THE INVENTION

The inventors have surprisingly found that energy efficiency in the production of polyolefin could be increased. The present invention allows the recovery of thermal energy produced on a polymerization site, in particular with the cooling system of the polymerization reactor, and the use of this thermal energy for the production of steam and/or electricity and/or mechanical power which is recycled back to the polymerization site. Said steam can then be used in heaters that flash liquid in the effluent of the polymerization reactor, and fractionation columns that process recovered diluent and/or monomer. The recovery of a part of polymerization heat is a step further in the direction of minimizing the energy consumption of polyolefins production.

The present invention provides a process for cooling a polymerization reaction for producing polyolefins comprising the steps of: (a) thermally contacting said polymerization reaction with a cooling fluid such that the cooling fluid removes thermal energy from said reaction, (b) thermally contacting said cooling fluid with a working fluid thereby recovering said thermal energy from said cooling fluid in said working fluid, and (c) thermally contacting the cooling fluid obtained in step (b) with the polymerization reaction thereby cooling said reaction, wherein the working fluid is phase converted thereby providing energy in the form of heat and/or electricity and/or mechanical power back to the polyolefin production process.

In an embodiment, the polymerization reaction is performed in a polymerization reactor and comprises the steps of
- introducing into said reactor one or more olefin reactants, polymerization catalysts and diluents, and while circulating said reactants, catalysts and diluents,
- polymerizing said one or more olefin reactants to produce a polymer slurry comprising essentially liquid diluent and solid olefin polymer particles,
- controlling the reactor temperature using the cooling fluid and recovering at least a portion of the thermal energy from said cooling fluid by the working fluid in thermal contact with said cooling fluid,
- allowing said polymer slurry to settle, and
- discharging the settled polymer slurry out of said reactor.

The present invention also provides a polymerization process for producing olefin polymers in a reactor, comprising the steps of
- introducing into said reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, controlling the reactor temperature using a cooling fluid, allowing said polymer slurry to settle, and discharging the settled polymer slurry out of said reactor, wherein said process further comprises the step of recovering at least a portion of the thermal energy from said cooling fluid by a working fluid in thermal contact with said cooling fluid, wherein said working fluid is phase converted thereby providing energy in the form of heat and/or electricity and/or mechanical power back to the polyolefin production process.

In an embodiment of the present invention, at least 10%, at least 20%, at least 30%, at least 40% or at least 50% of the thermal energy of the cooling fluid is recovered.

The present invention also relates to a process for energy optimization of energy consumption in a polymerization process comprising the step of: recovering at least a portion of the thermal energy produced by said polymerization reaction in a working fluid, wherein said working fluid is phase converted thereby providing energy in the form of heat and/or electricity and/or mechanical power back to the polyolefin production process.

The present invention allows reducing energy consumption in a polyolefin production process. The present invention improves plant efficiency and permits to recover wasted energy resources.

The present invention will be further disclosed in detail hereunder. The description is only given by way of example and does not limit the invention. The reference numbers relate to the hereto-annexed figures.

DETAILED DESCRIPTION

The invention provides a system for energy valuation in a process of olefin polymerization, characterized in that a working fluid is phase converted during the heat recovery process.

The present invention also concerns a polymerization process for producing olefin polymers in a reactor, comprising the steps of introducing into said reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, controlling the reactor temperature using a cooling fluid, and recovering at least a portion of the thermal energy from said cooling fluid by a working fluid in thermal contact with said cooling fluid, wherein said working fluid is phase converted thereby providing energy in the form of heat and/or electricity and/or mechanical power back to the polyolefin production process.

In a preferred embodiment said cooling fluid (also referred as reaction cooling fluid) is water. According to the present invention, a working fluid is utilized to recover the thermal energy from the reaction cooling water.

As used herein, the term "working fluid" refers to the medium evolving within a thermodynamic cycle.

Any of various working fluids can be used according to the present invention. The selection can be made from several general classes of working fluids. A first general class is hydrocarbons, including propane (R290), isobutane (R600a), n-butane (R600), cyclopropane (RC270), ethane (RI 70), n-pentane (R601), and isopentane (R601). A second general class is chlorohydrocarbons (e.g., methyl chloride (R40)). A third general class is chlorofluorocarbons (e.g., trichlorofluoromethane (RII), dichlorodifluoromethane (R12), monofluorodichloromethane (R21), and monochlorodifluoromethane (R22), and trichlorotrifluoroethane (RI 13), as well as RI 14, R500, and R123 (or HCFC-123)). A fourth general class is fluorohydrocarbons (e.g., tetrafluoroethane (RI 34), pentafluoroethane (R125), R502, R407C, R410, and R417A, and HFE-7000). A fifth general class is other compounds such as ammonia (R717), sulfur dioxide (R764), and carbon dioxide. Another class of working fluids that may be advantageous for some uses is nanofluids.

In an embodiment, said working fluid is selected from the group comprising hydrocarbons, chlorohydrocarbons, chlorofluorocarbons, fluorohydrocarbons, ammonia, sulfur dioxide, carbon dioxide and nanofluids.

In a particularly preferred embodiment, said working fluid is selected from the group comprising n-pentane, isopentane, n-butane, isobutane, propane, isopropane, ammonia, and mixtures thereof.

According to an embodiment of the present invention, said step of thermal energy recovering in said process comprises: thermally contacting a reaction cooling fluid with said working fluid thereby evaporating said working fluid into a gas via thermal energy absorption, pressurizing said gaseous working fluid, and releasing the enthalpy of said pressurized working fluid by condensing said working fluid, and reducing the pressure of said condensed working fluid prior to thermally contacting said working fluid with said cooling fluid.

According to a first particular embodiment, at least a portion of said thermal energy from said cooling fluid is recovered using a compression heat cycle. Preferably, a compression heat pump is used.

The term "enthalpy" as used herein refers to the heat liberated or adsorbed by said working fluid.

According to a particular embodiment, the thermal energy from said cooling fluid is recovered in a working fluid which is phase converted to produce heat and at least a fraction of the heat is used to produce steam, preferably low pressure steam. In an embodiment, if high pressure is desired, said low pressure steam may be compressed to obtain high pressure steam, and a temperature increase. This system allows recovering steam condensate and converting said condensate into steam. Preferably steam condensate providing from the polymerization unit is thermally contacted with said working fluid, said working fluid releasing the heat absorbed from the cooling fluid to the steam condensate.

According to a preferred embodiment, energy transfer between the cooling fluid and the steam production unit is provided via said working fluid (also referred as refrigerant fluid) flowing in a closed loop: vapors of working fluid superheated with the thermal energy from the cooling fluid are compressed and further condensed. The compressed gases are cooled and then pass into the liquid state during condensation. The enthalpy released during the cooling is used to produce steam (heat transfer fluid). The working fluid is condensed by giving up the heat to the heat transfer fluid (preferably water) which evaporates (steam). The heat transfer fluid is preferably a condensate providing from low pressure steam used in the polymerization unit. The condensate when in contact with the working fluid is transformed in low pressure steam by heat transfer from said working fluid. The working fluid after condensation is saturating and liquefied. The liquefied working fluid is then expanded: The working fluid entering into contact with the cooling water is a mixture of liquid and vapor. Evaporation of the working fluid takes place when said working fluid takes from the cooling water of the reactor, the heat that it has absorbed in its use circuit. The cooling water of the reactor cools and gives up the energy it contains, by evaporating the working fluid until it is superheated. Preferably, the working fluid used in the present process is n-pentane.

According to a second particular embodiment, at least a portion of said thermal energy from said cooling fluid is recovered using a power cycle.

Power cycles are well known in the art. A power cycle is a cycle that takes heat and uses it to do work on the surroundings. There are numerous power cycles that are well known in the art. Examples of suitable power cycles include, but are not limited to, an organic rankine cycle (ORC).

Other examples of power cycles that can be used are disclosed in "A Review of Organic Rankine Cycles (ORCs) for the Recovery of Low-Grade Waste Heat "Energy, Vol. 22, No. 7, pp 661-667, 1997, Elsevier Science Ltd, Great Britain and Absorption Power Cycles", Energy, Vol. 21, No. 1, pp 21-27, 1996, Elsevier Science Ltd, Great Britain, are herein incorporated by reference.

According to an embodiment of the present invention, said step of thermal energy recovering in said process comprises: thermally contacting said cooling fluid with said working fluid, whereby said working fluid becomes a superheated saturated vapor, expanding said superheated vapor to generate enthalpy, condensing said vapor and cooling said vapor to become a saturated liquid, and pressurizing said condensed working fluid prior to recycling to thermally contact said working fluid with said cooling fluid.

In an embodiment, the enthalpy generated is preferably used to produce steam from steam condensate recovered from the polymerization unit. In another embodiment the enthalpy generated is preferably used to power a turbine for the production of electricity. According to a third particular embodiment, at least a portion of said thermal energy from said cooling fluid is recovered using an absorption refrigeration cycle. A typical absorption refrigerator uses at least two substances: ammonia and water as working fluids.

Suitable working fluids include a circulating material that undergoes a phase change to promote the absorption and release of heat energy such as one or more hydrofluorocarbons, such as $CH_3CHF_2$, $C_2HF_5$, $CH_2F_2$, $C_2H_3F_3$, $CHF_3$ and $C_2H_2F_4$ including R-152a, R-125, R-32, R-143a, R-23 and R-134a. Hydrocarbons, such as propane, butane, pentane, may also be used as working fluids. Combinations of working fluids may also be used, as well as combinations of working fluids and lubricants. Thermal energy recovered by said working fluid can be recycled back to the polymerization process.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

The present invention is particularly suitable for polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bar, preferably at pressure of from 30 to 50 bar, more preferably at pressure of 37 to 45 bar.

In a preferred embodiment, present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene. In another embodiment the present invention is described in terms of the polymerization of ethylene for manufacturing bimodal polyethylene (PE). "Bimodal PE" refers to PE that is manufactured using two reactors, which are connected to each other in series.

Ethylene polymerizes in a liquid diluent in the presence of a catalyst, optionally a co-catalyst, optionally a co-monomer, optionally hydrogen and optionally other additives, thereby producing polymerization slurry.

As used herein, the term "polymerization slurry" or "polymer slurry" or "slurry" means substantially a multi-phase composition including at least polymer solids and a liquid phase and allows for a third phase (gas) to be at least locally present in the process, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, and xylene. In a preferred embodiment of the present invention, said diluent is isobutane. However, it should be clear from the present invention that other diluents may as well be applied according to the present invention.

Suitable catalysts are well known in the art. According to the present invention the term "catalyst" is defined herein as a substance that causes a change in the rate of a co-polymerization reaction without itself being consumed in the reaction. Examples of suitable catalysts include but are not limited to chromium oxide such as those supported on silica or aluminium, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

According to another embodiment, the process according to the present invention may also be applied in a double loop polymerization reactor consisting of two liquid full loop reactors, comprising a first and a second reactor connected in series by one or more settling legs of the first reactor connected for discharge of slurry from the first reactor to said second reactor.

The invention also provides a system for cooling a reaction of olefin polymerization, characterized in that a compression heat pump cycle, an absorption refrigeration cycle or an organic Rankine cycle is used to remove thermal energy from said polymerization reaction and phase conversion of a working fluid is used in the heat removal process.

In particular, the present invention provides a process for cooling a polymerization reaction comprising the steps of: removing thermal energy from said polymerization reaction in a working fluid, and utilizing at least a fraction of the thermal energy recovered in said working fluid to provide heat and/or electricity and/or mechanical power back to the polyolefin production process. In an embodiment said working fluid is in thermal contact with a reaction cooling fluid from which it removes thermal energy from said polymerization reaction. A compression heat pump, an absorption refrigeration unit or an organic Rankine cycle as described above can be used for said process.

In an embodiment said heat can be used to produce steam, preferably low pressure steam. In another embodiment said energy can be used to produce electricity and/or mechanical power.

In an embodiment, said process comprises evaporating said working fluid into a gas via thermal energy absorption, pressurizing said gaseous working fluid, releasing the enthalpy of said pressurized working fluid by condensing said working fluid, and reducing the pressure of said condensed working fluid prior to thermally contacting said working fluid with said cooling fluid. The enthalpy is preferably absorbed by a heat transfer fluid, preferably water which thereby converted to steam.

In another embodiment, said process comprises evaporating said working fluid into a gas via thermal energy absorption, whereby said working fluid becomes a superheated saturated vapor, expanding said superheated vapor to generate enthalpy, and condensing said vapor and cooling said vapor to become a saturated liquid, and pressurizing said condensed working fluid prior to recycling to thermally contact said working fluid with said cooling fluid.

The present invention also provides a process that increases the energy efficiency of polyolefin production processes. Such energy efficiency is increased by transforming wasted thermal energy from the polymerization reaction into energy using a working fluid, wherein the thermal energy produced by said polymerization reaction is recovered in said working fluid and said working fluid is further phase converted thereby providing energy in the form of heat and/or electricity and/or mechanical power back to the polyolefin production process. A compression heat pump, an absorption refrigeration unit or an organic Rankine cycle as described above can be used for said process.

In an embodiment, said process comprises the step of: recovering at least a portion of the thermal energy produced by said polymerization reaction in a working fluid, wherein said working fluid is phase converted thereby providing energy in the form of heat to steam condensate recovered from a polymerization unit thereby producing steam.

In an embodiment, the portion of the thermal energy from said cooling fluid is recovered using a compression heat cycle comprising thermally contacting a reaction cooling fluid with the working fluid thereby evaporating said working fluid into a gas via thermal energy absorption, pressurizing said gaseous working fluid, releasing the enthalpy of said pressurized working fluid by condensing said working fluid, and reducing the pressure of said condensed working fluid prior to thermally contacting said working fluid with said cooling fluid.

In another embodiment, the portion of the thermal energy from said cooling fluid is recovered using a power cycle, preferably an organic rankine cycle comprising: thermally contacting a reaction cooling fluid with said working fluid, whereby said working fluid becomes a superheated saturated vapor, expanding said superheated vapor to generate enthalpy, condensing said vapor and cooling said vapor to become a saturated liquid, and pressurizing said condensed working fluid prior to recycling to thermally contact said working fluid with said cooling fluid.

The present invention also provides polyolefin producing unit, comprising: means for feeding monomer, a co-monomer, diluent, a polymerization catalyst and optionally hydrogen to at least one polymerization reactor; a reactor system comprising at least one polymerization reactor defining a flow path for a polymer slurry, one or more lines for discharging said polymer slurry out of said polymerization reactor, wherein said at least one polymerization reactor is coupled with a heat recovery unit selected from a compression heat pump, an absorption refrigeration unit, or an organic rankine cycle.

In an embodiment, said heat recovery unit is coupled to a steam production unit.

In another embodiment, said heat recovery unit is coupled to an electricity production unit.

In a preferred embodiment, said polyolefin producing unit, comprises:
means for feeding monomer, a co-monomer, diluent and optionally hydrogen to at least one polymerization reactor;
means for feeding a polymerization catalyst in said at least one polymerization reactor,
a reactor system comprising at least one polymerization reactor defining a flow path for a polymer slurry, said slurry consisting essentially of at least one monomer, a co-monomer, a polymerization catalyst, liquid diluent and solid olefin co-polymer particles,
one or more lines for discharging said polymer slurry out of said polymerization reactor,
a diluent/monomer recovery system configured to separate a majority of the liquid diluent from the slurry discharged from said at least one polymerization reactor;
a fractionation system configured to process a portion of the liquid diluent discharged from the diluent/monomer recovery system and to provide recovered liquid diluent substantially free of olefin monomer; and
an extrusion/loadout system having an extruder/pelletizer configured to extrude and pelletize polyolefin particles recovered from the slurry in the diluent/monomer recovery system, wherein said at least one polymerization reactor is coupled with a heat recovery unit selected from a compression heat pump, an absorption refrigeration unit or a power cycle configured to recover the thermal energy. In an embodiment said heat recovery unit is coupled to a steam production unit. The heat recovery unit typically includes a condenser and an evaporator arranged in a circuit. The absorption refrigeration unit typically comprises one or more cooling circuits, each comprising a generator, a condenser and an evaporator, in association with an expansion valve.

The compression heat pump typically comprises one or more cooling circuits, each comprising a condenser and an evaporator, in association with a compressor and an expansion valve. In an embodiment said compression heat pump is further coupled to a steam production unit, wherein a steam condensate line is configured to be in thermal contact with a working fluid in said condenser thereby converting said condensate into steam. In an embodiment, a compressor is further coupled to said compression heat pump. For example, in a process of recovering thermal energy into low pressure steam, if high pressure is desired, a second compressor can be used. The steam is first generated at low pressure using a compression heat pump, and the desired pressure is then reached by compression of the steam with said second compressor.

Figure 1:
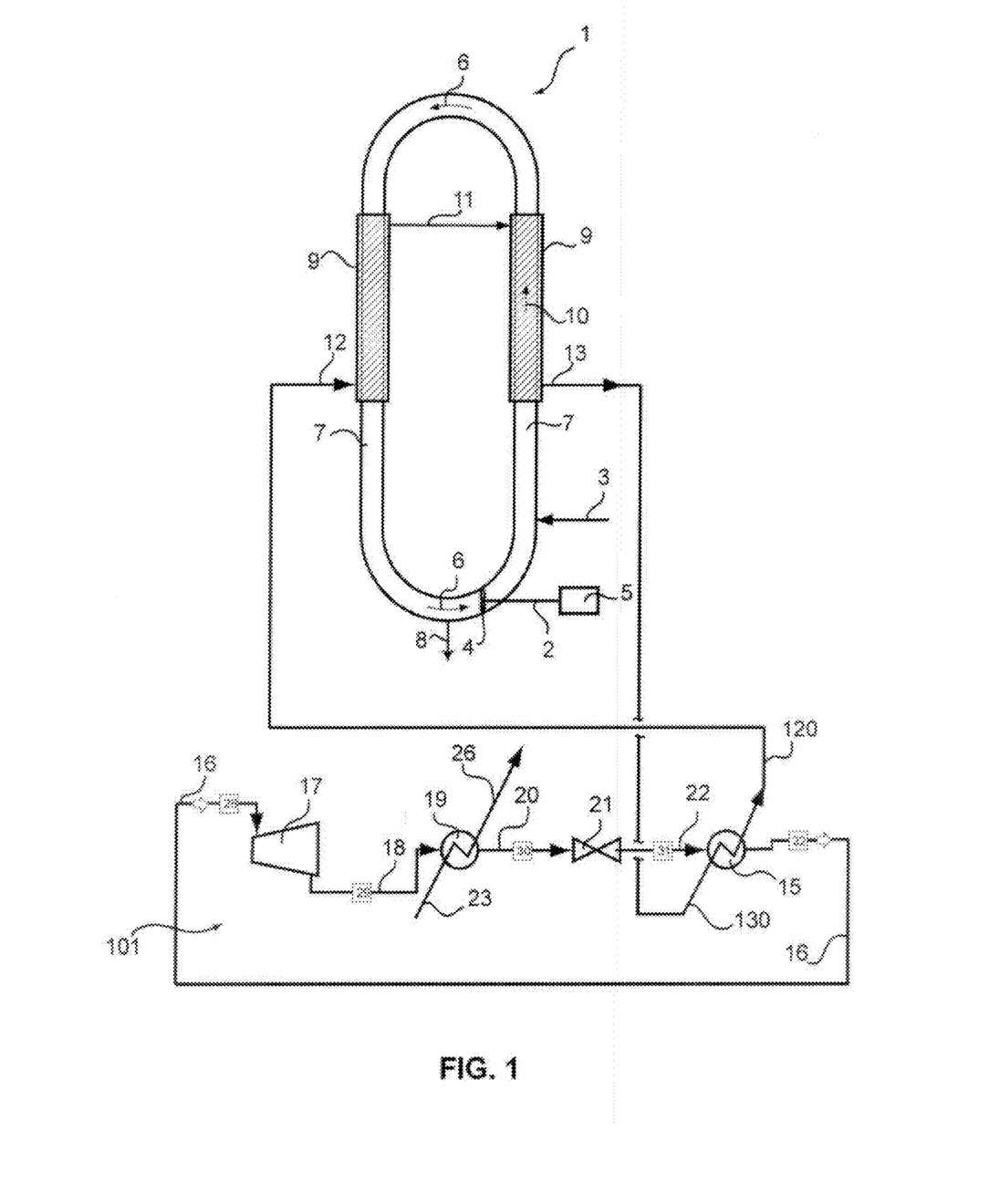
FIG. 1 schematically represents a polymerization reactor coupled with a compression heat pump in accordance with one embodiment of the present invention.

FIG. 1 represents a single loop reactor 1 which is operably connected to a compression heat pump 101, according to an embodiment of the invention. The single loop reactor 1 comprises interconnected pipes 7. It will be understood that while the loop reactor 1 is illustrated with two vertical pipes 7, said loop reactor 1 may be equipped with more pipes, such as four or more pipes, for example six vertical pipes, for example between four and 20 vertical pipes. The vertical sections of the pipe segments 7 are provided with heat jackets 9. Polymerization heat is extracted by means of cooling water circulating in these jackets 9 of the reactor 1.

Reactants such as diluent, monomer, optional co-monomers and reaction additives can be introduced into the reactor 1 by line 3. Catalyst, optionally in conjunction with a co-catalyst or activation agent, can be injected in the reactor.

The polymerization slurry is directionally circulated throughout the loop reactor 1 as illustrated by the arrows 6 by one or more pumps, such as axial flow pump 2. The pump may be powered by an electric motor 5. As used herein the term "pump" includes any device from compressing driving, raising the pressure of a fluid, by means for example of a piston or set of rotating impellers 4.

The reactor 1 can be further provided with one or more settling legs (not shown) for discharging the polymer slurry to a product recovery zone 8.

The settling legs can be provided with product take off or discharge valves. The discharge valves may be any type of valve, which can permit continuous or periodical discharge of polymer slurry, when it is fully open. An angle valve or ball valves may be suitably used. For example, the valve may have such a structure that solid matter is prevented from accumulating or precipitating at the main body portion of the valve. However, the type and structure of the discharge valve can be selected by those skilled in the art as required. A part or the totality of the leg is discharged at each opening of the discharge valve. Polymer slurry settled in the settling legs may be removed by means of one or more product recovery lines. e.g. to the product recovery zone 8.

The settled polymer slurry may be continuously or periodically discharged from the loop reactor 1 into said product recovery zone 8. As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of said settling legs; the extracted slurry may be depressurized and transferred through for example heated or not heated flash lines to a flash tank where the polymer and the unreacted monomer and/or co-monomer and diluent are separated. The degassing of the polymer may be further completed in a purge column.

When at least one reactor is present downstream of said settling legs, the extracted slurry is transferred through transfer lines connected to said settling legs to the next reactor. Transfer is made possible by injecting the slurry in the downstream reactor in a point where the pressure is lower than the pressure at the outlet of the settling legs.

The present invention encompasses single or more loop reactors thermally connected to a heat recovery units according to the present invention, which can be used in parallel or in series.

The vertical sections of the pipe segments 7 are provided with heat jackets 9. Polymerization heat is extracted by means of cooling water circulating in these jackets 9. The cooling water 120 circulates from pipe 12 into jacket 9 of a vertical pipe 7 and circulates 10 through next reactor jacket 9 via interconnecting pipe 11. The cooling water 130 exits from the reactor jacket through pipe 13. The cooling water 130 is further circulated in a heat exchanging unit in thermal contact with the evaporator 15 of a compression heat pump 101, wherein thermal energy from the cooling water is removed through a working fluid and cooled water 120 is returned to the reactor through lines 12.

The compression heat pump 101 typically includes a condenser 19 and an evaporator 15 arranged in a circuit. Energy transfer is provided via a working fluid flowing in a closed loop. A compressor 17 draws out superheated vapors 16 of working fluid issuing from the evaporator 15 and compresses them 18 to discharge them into the condenser 19. The compressed gases 18 are cooled and then pass into liquid state in the condenser 19. This is a surface type heat exchanger with circulation of the working fluid to be condensed on one side and the heat transfer fluid to be vaporized (condensed water), on the other. Said condenser 19 condenses the working fluid by giving up the heat to the heat transfer fluid 23 which evaporates 26. The working fluid 20 leaving the condenser 19 is saturating. The liquefied working fluid 20 is then expanded 22 by an expansion valve 21: The expended working fluid 22 entering the evaporator 15 is a mixture of liquid and vapor. Evaporation takes place at the vaporization temperature corresponding to the evaporation pressure of the working fluid. The working fluid takes from the cooling water 130 of the reactor 1, the heat that said cooling water has absorbed while cooling said reactor 1. The cooling water of the reactor in the evaporator 15 cools down 120 and gives up the energy it contains, by evaporating the working fluid until it is superheated 16. Super heated working fluid 16 is then recycled back to the condenser 19 as a compressed working fluid 18 by compressor 17.

Figure 2:
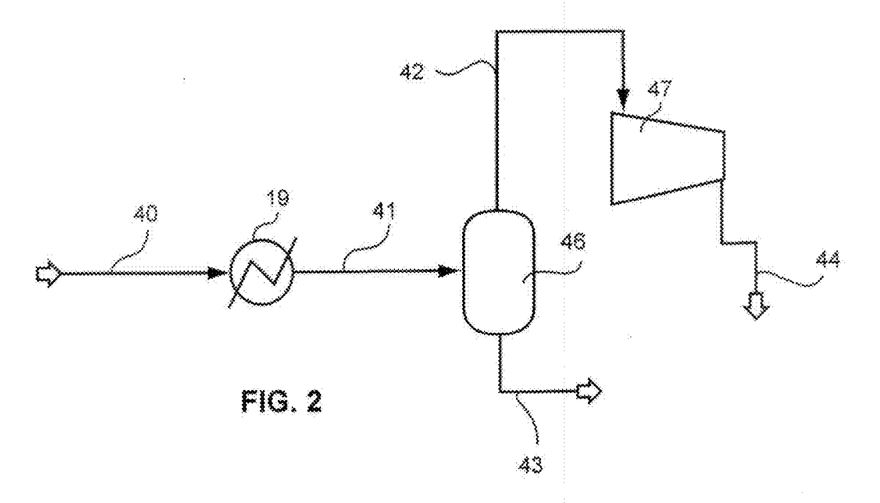
FIG. 2 represents a schematic recompression unit used in accordance with an embodiment of the present invention.

In an embodiment illustrated in FIG. 2, the steam generated in the exchanger 19 can be further compressed by a compressor 47. This step of steam compression requires very little energy, but the temperature increase induced by the compression widely enhances the potential of the steam 44 usage. The condenser 19 is where heat exchange takes place between the working fluid n-pentane and the condensate (stream 40) to be evaporated. The stream 41 obtained may contain a liquid water fraction, in that case liquid and steam can be separated using an optional flashing device 46 before sending the steam 42 to the compressor 47. Liquid is recovered in stream 43 and the compressed steam exit compressor 47 in stream 44.

Figure 3:
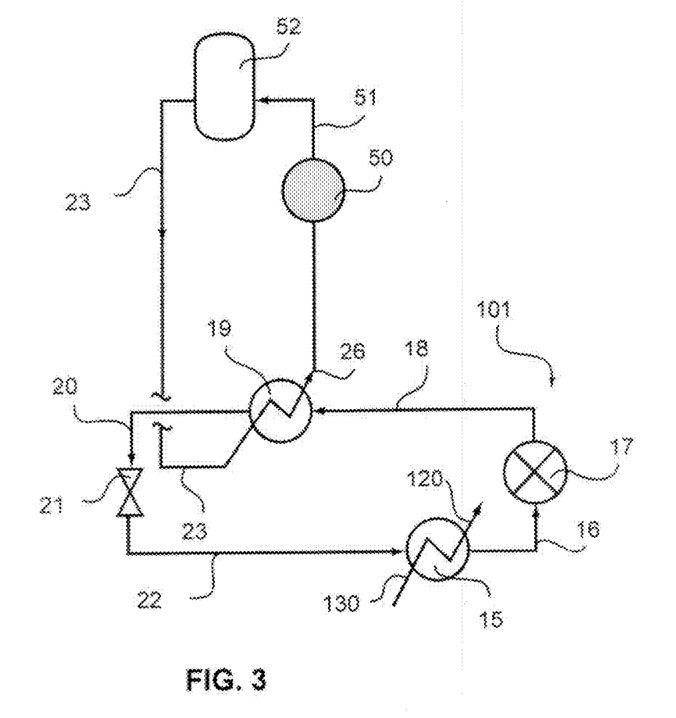
FIG. 3 schematically represents a compression heat pump coupled with a steam production unit in accordance with one embodiment of the present invention.

In an embodiment illustrated in FIG. 3, a steam production unit is further coupled to the compression heat pump 101. In the condenser 19 circulation of the working fluid to be condensed happens on one side and the heat transfer fluid (here a steam condensate) 23 to be vaporized happens on the other side. The condenser 19 condenses the working fluid which transfers its heat to the steam condensate 23 which evaporates 26 into steam. Said steam 26 is then conveyed for use in the polymerization unit/process 50. The steam once used 51 is recovered in a container 52 as steam condensate 23 wherein it is recycled into steam using the compression heat pump coupled to said polymerization reactor. Preferably said steam is low pressure steam and said condensate is low pressure steam condensate. The liquefied working fluid 20 is then expanded 22 in expansion valve 21: The expended working fluid 22 enters the evaporator 15 wherein it is vaporized 16 by energy transfer of the heat from the cooling water 130 coming from the reactor, said cooling water being thereby cooled 120. The superheated working fluid 16 is then compressed 18 by compressor 17 and then condensed 20 in the condenser 19 wherein the absorbed enthalpy is released converting steam condensate 23 into steam 26.

Figure 4:
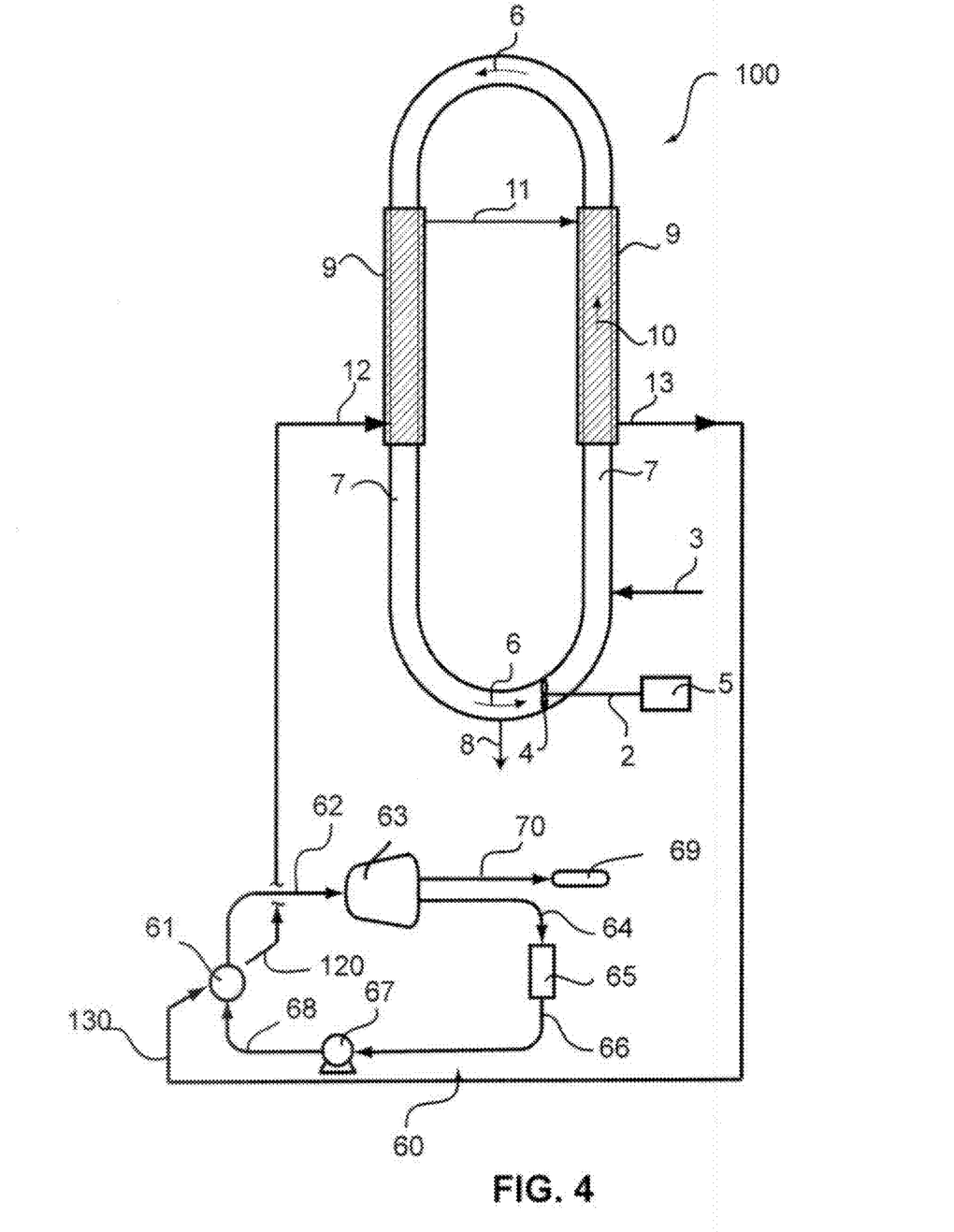
FIG. 4 schematically represents a polymerization reactor coupled with an Organic Rankine Cycle dedicated to electricity production in accordance with one embodiment of the present invention.

In an embodiment illustrated in FIG. 4, a single loop reactor 100 is operably connected to an electricity production unit 60. The single loop reactor 100 comprises interconnected pipes 7. The vertical sections of the pipe segments 7 are provided with heat jackets 9. Polymerization heat is extracted by means of cooling water circulating in these jackets 9 of the reactor 1. Reactants can be introduced into the reactor 1 by line 3. The polymerization slurry is directionally circulated 6 throughout the loop reactor 1 by a pump 2 comprising a set of rotating impellers 4 powered by a motor 5. The reactor 1 can be further provided with one or more settling legs (not shown) for discharging the polymer slurry to a product recovery zone 8.

The pipes 7 are provided with heat jackets 9. Polymerization heat is extracted by means of cooling water 120 circulating in these jackets 9. The cooling water 120 circulates from pipe 12 into jacket 9 of a vertical pipe 7 and circulates 10 through next reactor jacket 9 via interconnecting pipe 11. The cooling water 130 exits from the reactor jacket through pipe 13. In this embodiment, the polymerization reactor 100 is coupled to the electricity production unit 60. This electricity unit 60 relies on the principle of Organic Rankine Cycle. In the heat exchanger 61 the working fluid 68 is vaporized with the help of the energy brought by the cooling water 130 from the reactor 100. The reactor coolant 130 is then chilled 120, and sent back to the reactor 100 for reactor refrigeration. The working fluid 62 is then flashed in a turbine 63, delivering at this equipment mechanical power 70, that can converted into electricity in the generator 69. The generated electricity can be conveyed for use in the polymerization unit/process (not shown). Alternatively, the turbine 63 can be directly coupled to a rotating machine of polymerization unit (not shown), for direct use of the delivered mechanical power. The condenser 65 condenses the working fluid 64 which transfers its heat to cooling water. The working fluid 66, now at liquid state is further pumped by pump 67 to the evaporator 61.

While the invention has been described in terms of the presently preferred embodiment, reasonable variations and modifications are possible by those skilled in the art and such variations are within the scope of the described invention and the appended claims.

This invention can be further illustrated by the following examples of preferred embodiments thereof, although it will be understood that this example is included merely for purposes of illustration and are not intended to limit the scope of the invention unless otherwise specifically indicated.

EXAMPLES

Example 1

This example describes the use of compression heat pumps in a PE (polyethylene) unit for the recovery of wasted energy in the process and the use of this energy for the production of low pressure steam in another embodiment of the present invention.

The recovery of the heat of the cooling water was studied using compression heat pumps as refrigeration units.

The energy content of cooling water is in large excess. The present example illustrate the use of the cooling water of a loop reaction as cold source (around 75° C.) in a compression heat pump, wherein the water thermal energy was used to generate low pressure steam (around 125° C.). A cycle with n-pentane as thermal fluid was used. The energy performance was determined from the ratio of the quantity of heat produced to the electrical energy consumed. This ratio is the coefficient of performance (COP). The coefficient of performance (COP) depends on: the temperature of the heat source and of the heat distribution system, on the auxiliary energy consumption (pumps, etc.), on the rated efficiency of the pump and on the dimensioning of each of the heat pump with regard to demand and operating conditions.

The closed cycle of a mechanical heat pump was simulated with a process engineering software, with 1 t/h of n-pentane as heat transfer fluid. A schematic compression heat pump 101 used in this example is illustrated in FIG. 1. The working fluid at a pressure P28 and Temperature T28 is compressed to a pressure P29 and temperature T29 by a compressor 17. The pressurized fluid is then condensed in a condenser 19 and exit said condenser 19 at a temperature T30 and pressure P30 (=P29). The condensed working fluid is then expended to a pressure P30 and a temperature T30 using an expansion valve 35 and is further vaporized to a Temperature T32 (T28) and pressure P32 in an evaporator 21 using the cooling water thermal energy (the cooling water arriving from line 13 is in thermal contact with the evaporator 15, the thermal energy from the cooling water is removed through said working fluid and cooled water is returned to the reactor through lines 12). The working fluid is then further compressed using compressor 17 and so forth. The results of the experiment are shown in Table 1, wherein IT (low temperature) corresponds to the temperature T28, T31 and T32 of the n-pentane working fluid (temperatures at phase 28, 31 and 32 on FIG. 1), wherein hT (high temperature) corresponds to the temperature T29 and T30 of the n-pentane working fluid (temperatures at phase 29 and 30 on FIG. 1), wherein lP (low pressure) correspond to the pressure P28, P31 and P32 of the n-pentane and hP (high pressure) correspond to the pressure P29 and P30.

TABLE 1

| lP (bar) | hP (bar) | hP/lP | IT (° C.) | hT (° C.) | hT − IT | Qevap (kW) | W (kW) | Qrec (kW) | COP = Qrec/W |
|---|---|---|---|---|---|---|---|---|---|
| 3 | 11.1 | 3.7 | 72.4 | 130.2 | 57.8 | 42.74 | 16.31 | 62.42 | 3.83 |
| 3 | 12 | 4.0 | 72.4 | 134.3 | 61.9 | 42.54 | 17.06 | 59.6 | 3.49 |
| 2.452 | 12.261 | 5.0 | 65 | 135.4 | 70.4 | 38.16 | 19.43 | 57.59 | 2.96 |

The ratio hP/lP is the compression ratio of the compressor 17. Qevap is the heat input (by cooling water) to the evaporator 15, Qrec is the heat supplied by the heat pump to the condensate to be vaporized, and W the work done by the compressor 17 (isentropic operation, with an isentropic efficiency η = 72%). The COP is then equal to Qrec/W.

Table 1 clearly shows the variables mainly determining the COP. One of these variables is the compression ratio to the COP for various values of the initial pressure.

The n-pentane is evaporated in a heat exchanger using the reactor cooling water flow (which is at about 80° C.). The cooling water is suitable cooled in the evaporator 15 to 75° C.

The energy recovered can then be used to evaporate condensate water (initially at about 70° C.) at a usable pressure estimated initially at about 2.3 bar (125° C.).

The use of other fluids such as isobutane and n-butane was also tested. The results are shown in Table 2.

TABLE 2

| lP (bar) | hP (bar) | Ph/Pb | lT (° C.) | hT (° C.) | Qevap (kW) | W (kW) | Qrec (kW) | COP = Qrec/W |
|---|---|---|---|---|---|---|---|---|
| working fluid = iso-butane | | | | | | | | |
| 9.706 | 29.117 | 3 | 65 | 122.9 | 24.1 | 15.24 | 39.34 | 2.58 |
| 9.706 | 31.058 | 3.2 | 65 | 127.5 | 18.94 | 16.24 | 35.18 | 2.17 |
| working fluid = n-butane | | | | | | | | |
| 7.192 | 25.171 | 3.5 | 65 | 126.9 | 32.42 | 18.13 | 50.55 | 2.79 |
| 7.192 | 28.767 | 4 | 65 | 134.8 | 23.17 | 19.95 | 43.12 | 2.16 |

Recovering the heat of the cooling water of a loop reactor using a compression heat pump according to an embodiment of the present invention can enable the production of large amount of low pressure steam. The low pressure steam produced can then be used for the ethylene heating and for recycling of monomers. Surplus low pressure steam can then be compressed using a MVR (mechanical vapor recompression), which would enable to produce high pressure steam for example at 190° C.

Example 2

This example describes the use of compression heat pumps in a PE (polyethylene) unit for the recovery of wasted energy in the process and the use of the recovered energy of the production of low pressure steam in another embodiment of the present invention.

The cooling system of a reactor can also be used to produce steam at lower temperature (around 100-110° C.) using a compression heat pump wherein the produced steam is recompressed to about 2.5 bar using a compressor. FIG. 2 represents a schematic compression heat pump with recompression used in this example. The condenser 19 is where heat exchange takes place between the working fluid n-pentane and the condensate (stream 40) to be evaporated. The stream 41 obtained may contain a liquid water fraction, in that case liquid and steam can be separated using an optional flashing device 46 before sending the steam 42 to the compressor 47 with an isentropic efficiency n=72%. Liquid is recovered in stream 43 and the compressed steam exit compressor 47 in stream 44.

The quantity of water that can be vaporized depends on the quantity of heat Qrec and the temperature Th. As an example the heat necessary to vaporize 1 t/h of steam was considered to be Qrec=699 kW. The experiment was performed based on the recompression of 1 t/h of steam.

To compare the total COPs without any influence of the quantity of vaporized water (on the value of work delivered in the compressor), the results of Table 3 are given with the quantity of n-pentane necessary to produce 650 kW in the condenser, and the simulations according to the previous figure were made with a heat input of Qrec=650 kW and for 1 t/h of condensate water vaporized.

The results obtained are shown in Table 3, wherein the values Pi and Ti correspond to the pressure and temperature after the vaporization of the water, but before recompression. Tf corresponds to the temperature of the recompressed steam. The value of Ti can be selected to be around 100-120° C., so that the COP can be fairly high if Ti is about 100° C. (COP>5) or can be of medium value (3<COP<5) if Ti is about 110-120° C.

TABLE 3

| $P_f$(bar) | $T_f$(° C.) | $W_{recomp}$ (kW) | $COP_{global}$ |
|---|---|---|---|
| 1.02 | 128.9 | 16.69 | 6.93 |
| 1.4 | 129.4 | 11.46 | 5.46 |
| 1.8 | 131.9 | 8.36 | 4.61 |
| 1.35 | 127.9 | 11.2 | 4.65 |
| 2 | 131.3 | 5.97 | 3.65 |

A heat pump, according to example 1, was chosen with a Ti close to 100° C. and a good COP (>5). Then the second compressor 47 increased the temperature, and the global COP decreased due to the consumption of this compressor. The global COP, for a given final temperature, is higher than in one stage.

Example 3

This example describes the use of an Organic Rankine Cycle in a PE (polyethylene) unit for the recovery of wasted energy in the process and the use of the recovered energy of the production of electricity in another embodiment of the present invention.

The example was performed on the cooling water of a loop reactor wherein thermal energy gained by the water was about 7.5 MW environ with exit temperature around 80-85° C. The experiments were performed by testing three working fluids n-propane, isobutene and ammoniac using the conditions shown in Table 4.

TABLE 4

| | | Evaporator | | Condenser | | Turbine | |
|---|---|---|---|---|---|---|---|
| Simulation | Fluids | T inlet (° C.) | T outlet (° C.) | T inlet (° C.) | T outlet (° C.) | P inlet (bara) | P outlet (bara) |
| 1 | $NH_3$ | 40 | 72.5 | 39 | 39 | 35 | 15 |
| 2 | $NH_3$ | 38 | 76 | 36.5 | 36.5 | 38 | 14 |
| 3 | $NH_3$ | 19.4 | 72.5 | 18 | 18 | 35 | 8 |
| 4 | isobutane | 39 | 79 | 51.4 | 38 | 13 | 5 |
| 5 | isobutane | 21 | 79 | 40 | 20 | 13 | 3 |
| 6 | Propane | 37 | 77.4 | 34.3 | 34.3 | 30 | 12 |
| 7 | Propane | 21 | 78 | 18.3 | 18.3 | 30 | 8 |

The results obtained are shown in Table 5.

TABLE 5

| | Fluid flow and Power (for Q evaporator = 7.5 MW) | | | | Fluid flow and Power (for Q evaporator = 3 MW) | | | | |
|---|---|---|---|---|---|---|---|---|---|
| Simulation | Flow (t/h) | W pump (kW) | W turbine (kW) | Cond (kW) | flow (t/h) | W pump (kW) | W turbine (kW) | Cond (kW) | Efficiency $\eta$ (%) |
| 1 | 23.4 | 38 | 504 | 7031 | 9.4 | 15 | 202 | 2812 | 6.2 |
| 2 | 23 | 45 | 583 | 6961 | 9.2 | 18 | 233 | 2785 | 7.2 |
| 4 | 73.4 | 52 | 556 | 6995 | 29.4 | 21 | 222 | 2798 | 6.7 |
| 6 | 80.5 | 137 | 608 | 7029 | 32.2 | 55 | 243 | 2812 | 6.3 |

Efficiency was defined by: $\eta$ = (W turbine − W pump)/Q evaporator.

The measured efficiency was between 6 and 10%.

The invention claimed is:

1. Process for cooling a polymerization reaction for producing polyolefin comprising:
   (a) thermally contacting said polymerization reaction with a cooling fluid such that the cooling fluid removes thermal energy from said reaction;
   (b) thermally contacting said cooling fluid with a working fluid thereby recovering said thermal energy from said cooling fluid in said working fluid; and
   (c) thermally contacting the cooling fluid obtained in step (b) with the polymerization reaction thereby cooling said reaction, wherein the working fluid is phase converted thereby providing energy in the form of heat and/or electricity and/or mechanical power back to the polyolefin production process.

2. The process of claim 1, wherein said heat is used to produce steam.

3. The process of claim 2, wherein said steam is further pressurized for temperature increase.

4. The process of claim 1, wherein a portion of the thermal energy from said cooling fluid is recovered using a compression heat cycle.

5. The process of claim 1, wherein step (b) comprises evaporating said working fluid into a gas via thermal energy absorption, pressurizing said gaseous working fluid, releasing the enthalpy of said pressurized working fluid by condensing said working fluid, and reducing the pressure of said condensed working fluid prior to thermally contacting said working fluid with said cooling fluid.

6. The process of claim 1, wherein said energy is used to produce electricity and/or mechanical power.

7. The process of claim 1, wherein a portion of the thermal energy from said cooling fluid is recovered in a power cycle.

8. The process of claim 1, wherein step (b) comprises evaporating said working fluid into a gas via thermal energy absorption, whereby said working fluid becomes a superheated saturated vapor, expanding said superheated vapor to generate enthalpy, and condensing said vapor and cooling said vapor to become a saturated liquid, and pressurizing said condensed working fluid prior to recycling to thermally contact said working fluid with said cooling fluid.

9. The process of claim 1, wherein the polymerization reaction is performed in a reactor and comprises:
   introducing into said reactor one or more olefin reactants, polymerization catalysts and diluents, and while circulating said reactants, catalysts and diluents;
   polymerizing said one or more olefin reactants to produce a polymer slurry comprising liquid diluent and solid olefin polymer particles;
   controlling the reactor temperature using the cooling fluid and recovering at least a portion of the thermal energy from said cooling fluid by the working fluid in thermal contact with said cooling fluid;
   allowing said polymer slurry to settle; and
   discharging the settled polymer slurry out of said reactor.

10. The process of claim 9, wherein at least 10% of the thermal energy of the cooling fluid is recovered.

11. A polyolefin producing unit comprising:
   means for feeding monomer, a co-monomer, diluent, a polymerization catalyst and optionally hydrogen to at least one polymerization reactor;
   a reactor system comprising at least one polymerization reactor defining a flow path for a polymer slurry; and
   one or more lines for discharging said polymer slurry out of said polymerization reactor, wherein said at least one polymerization reactor is coupled with a heat recovery unit selected from a compression heat pump, an absorption refrigeration unit and or an organic rankine cycle.

12. The polyolefin producing unit of claim 11, wherein said heat recovery unit is coupled to a steam production unit.

13. A process for energy optimization of energy consumption in a polymerization process for producing polyolefins comprising:
   recovering at least a portion of the thermal energy produced by said polymerization reaction in a working fluid, wherein said working fluid is phase converted thereby providing energy in the form of heat and/or electricity and/or mechanical power back to the polyolefin production process.

14. The process of claim 13, wherein a portion of the thermal energy from said working fluid is recovered using a compression heat cycle comprising:
   thermally contacting a reaction cooling fluid with said working fluid thereby evaporating said working fluid into a gas via thermal energy absorption;
   pressurizing said gaseous working fluid;
   releasing the enthalpy of said pressurized working fluid by condensing said working fluid; and
   reducing the pressure of said condensed working fluid prior to thermally contacting said working fluid with said cooling fluid.

15. The process of claim 13, wherein a portion of the thermal energy from said working fluid is recovered using a power cycle comprising:
   thermally contacting a reaction cooling fluid with said working fluid, whereby said working fluid becomes a superheated saturated vapor;
   expanding said superheated vapor to generate enthalpy;
   condensing said vapor and cooling said vapor to become a saturated liquid; and
   pressurizing said condensed working fluid prior to recycling to thermally contact said working fluid with said cooling fluid.

* * * * *